May 5, 1970  M. E. GERRY  3,510,702
PERIODIC HIGH VOLTAGE SOURCE
Filed March 11, 1968  4 Sheets-Sheet 1

INVENTOR.
Martin E. Gerry.

INVENTOR.
Martin E Gerry

May 5, 1970     M. E. GERRY     3,510,702

PERIODIC HIGH VOLTAGE SOURCE

Filed March 11, 1968     4 Sheets-Sheet 4

INVENTOR.

Martin E. Gerry

United States Patent Office

3,510,702
Patented May 5, 1970

3,510,702
PERIODIC HIGH VOLTAGE SOURCE
Martin E. Gerry, Santa Ana, Calif.
(828 Lindale Ave., Drexel Hill, Pa. 19026)
Filed Mar. 11, 1968, Ser. No. 712,275
Int. Cl. H02k *11/00*
U.S. Cl. 310—70
9 Claims

ABSTRACT OF THE DISCLOSURE

The invention makes use of a periodically resonant circuit wherein the resonant current and magnetic flux caused thereby is interrupted to produce a high induced electromotive force. This source is usable as an ignition system, as a laser ignition system, as a high voltage photographic flash, and as a unit in other related applications.

ADVANTAGES

The advantages of this source is the simplicity of structure and high reliability of operation. A further advantage is the ability to produce an all magnetic ignition system with miniature components due to the high frequency of operation and ease of flux interruption, and in producing laser ignition systems. Still further advantages are realized in use of the equipment as photographic high voltage flash equipment used to power high intensity permanent high voltage flash lamp from a low voltage battery source, or to use the laser source for high intensity photographic flash applications.

DRAWINGS

Figure 1:
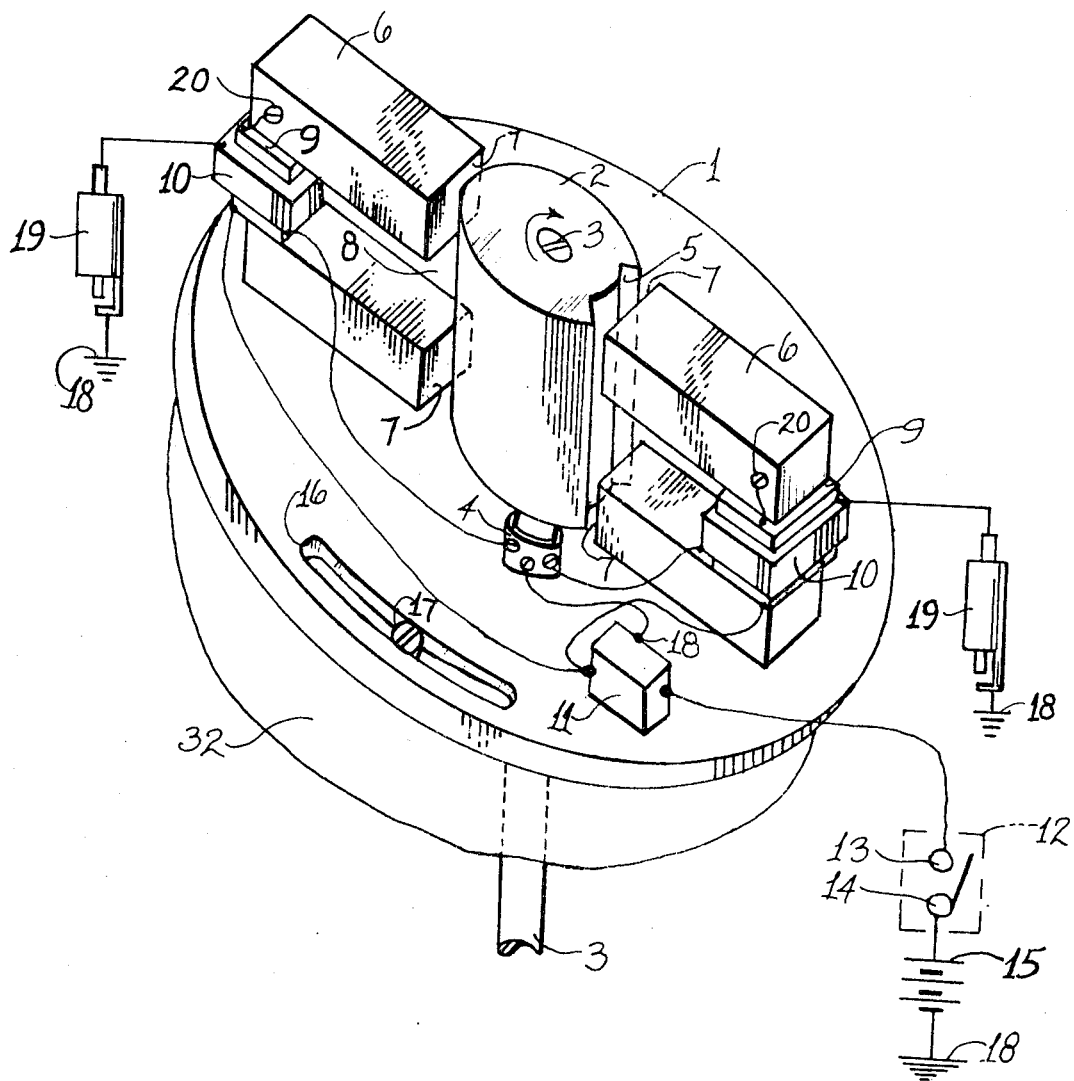
Figure 2:
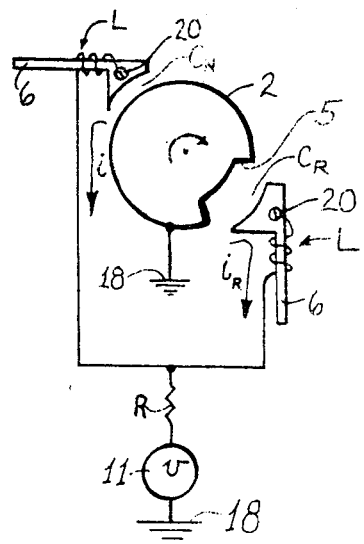
Figure 3:
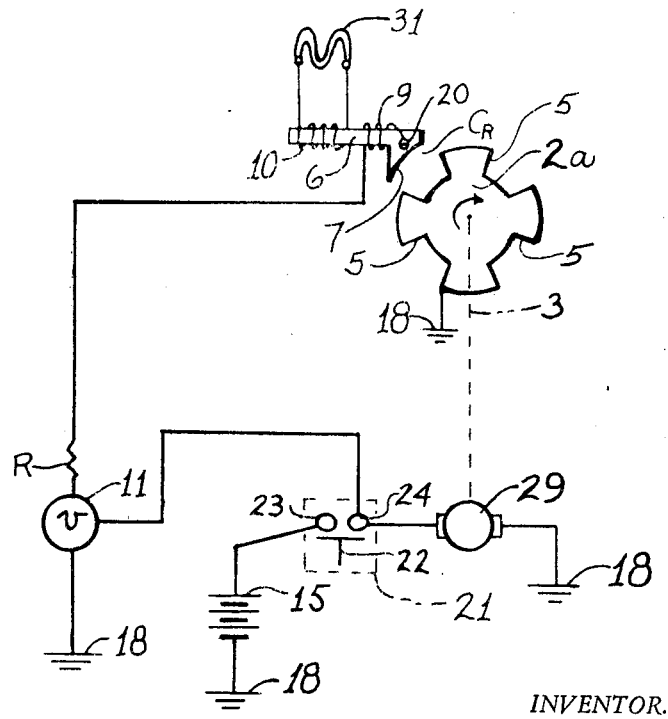
Figure 4:
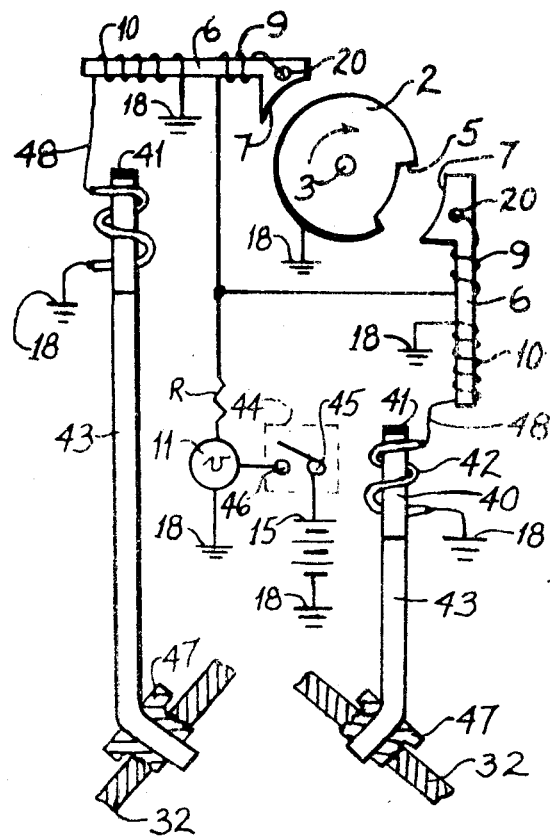
Figure 5:
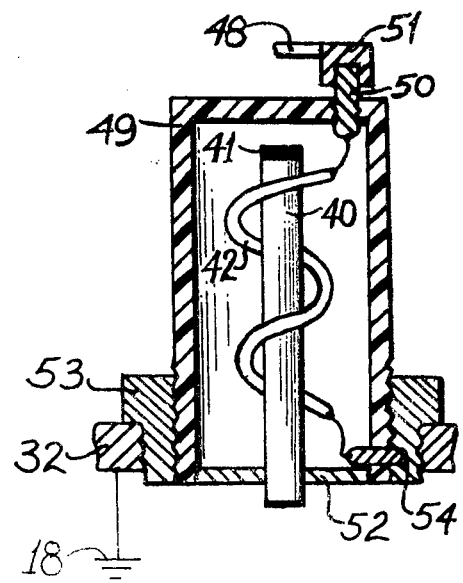

A more thorough understanding of the invention is realized by a study of the following detailed description taken in conjunction with the accompanying drawings of which:

FIG. 1 is a perspective view of a periodically interrupted resonant flux ignition system taken in accordance with the invention; and FIG. 2 is an electromechanical schematic representative of FIGURE 1 as a model for use in developing the theory of operation of the invention; and FIGURE 3 is an electromechanical schematic of a high voltage source used to power a permanent photographic flash lamp utilizing a small battery power means and showing another application of the invention; and FIG. 4 is an electromechanical schematic of a laser ignition system utilizing the principles embodied in the periodically interrupted resonant flux ignition system of FIG. 1 as well as having other laser components; and FIG. 5 is a cross-section view, partially in elevation, of a laser igniter optionally usable in lieu of certain laser components of FIG. 4.

THEORY OF OPERATION

Referring to FIGS. 1, 2, 3, and 4, and particularly the schematic of FIG. 2, it is seen that if we compute the current ($i$) through the inductance (L) in the general case, and evaluate the general case current with respect to conditions of resonance ($i_R$), off-resonance ($i_{OR}$), and the normal or steady condition ($i_N$), we may write the integro-differential equation comprising the general current response directly in Laplace transform notation and solve the total current general response by taking the inverse Laplace transform thus obtaining the transient and steady state response from which the three specific cases of currents may be taken. It will be noted that initial conditions consisting of the residual charges in inductance L and capacity C contribute a trivial change in the forcing function of the equations below and hence are omitted for simplicity of treatment.

Particular situation wherein this invention is quite unique resides in the fact that a variable rotatable capacitor is achieved which not only varies the capacitance thereby tuning through resonance, but also interrupts the magnetic flux of the magnetic circuit, the stationary portions of the magnetic cores upon which inductances L are wound being the stationary plates of the variable rotatable capacitor. A complete magnetic circuit is comprised of stationary portion 6 and rotatable portion 2. Therefore, at resonance, when groove 5 is aligned opposite faces 7, magnetic flux in the magnetic circuit is interrupted, and simultaneously, since one end of coil L (referred to in FIGS. 1 and 3 as coil 9) is electrically connected to core 6, the faces 7 of core 6 act like two plates of a capacitor connected in parallel and opposite the movable face of member 2 constituting the other plate of the two effective capacitors in parallel. This is specifically accomplished by the electrical connection from one side of L to core 6, the other side of L being electrically connected to a frequency source, the return side of which is at ground potential or the same potential as rotatable member 2 by virtue of electrical grounding through shaft 3 thereby completing the series circuit of an inductance, a capacity, and the total circuit resistance R of the frequency source 11 and the series winding of L. Also completed is the magnetic path through core 6 and rotatable member 2. The mounting plate of cores 6 must be of electrically non-conductive material so as not to electrically short circuit the capacitor effected by member 2 in combination with faces 7, nor to short circuit the inductance L, one side of which is already at the same electrical potential as core 6. Effecting an electrical capacitance of rotatable member in combination with a stationary magnetic core and at the same time causing the core members to be one side of plate pairs constituting a capacitor as well as simultaneously acting as an inductor and providing a means for resonant currents to flow in coil L simultaneously with interruption of the magnetic flux linking coil L when rotatable member 2 causes its groove 5 to pass faces 7 of core 6 is the essential difference between this invention and Pat. No. 3,265,-931, issued Aug. 9, 1966, as well as FIGS. 3 and 4 of patent application Ser. No. 599,335, filed Oct. 31, 1966, by the same inventor, since both of the above references do not have the structure and function of interruption of a resonant circuit and simultaneously a magnetic flux occurring as member 2 is rotated so that groove 5 aligns with the centers of faces 7 at which time peak resonant current is circulating (actually resonant peak is almost reached when groove 5 partially aligns with faces 7), the motion of groove 5 past faces 7 interrupts the magnetic flux present, inducing a high electromotive force in coil L.

Defining:

R=cumulative series resistance of the primary circuit which includes the resistance of inductance L and the voltage source $v$;

$v = V_m \sin \omega t$, where $V_m$ is the peak voltage and $\omega$ is the frequency in radians per second;

C=the symbol for any value of capacitance between core 6 and member 2.

The integro-differential equation for the general case neglecting initial conditions is:

$$V_m \sin \omega t = L\frac{di}{dt} + Ri + \frac{1}{C}\int i\,dt$$

Writing the above equation in Laplace transform notation:

$$\frac{V_m \omega}{s^2 + \omega^2} = \left(Ls + R + \frac{1}{Cs}\right)I(s)$$

From which:

$$I(s) = \frac{V_m \omega}{L} \left\{ \frac{s}{(s^2+\omega^2)\left(s^2+\frac{R}{L}s+\frac{1}{LC}\right)} \right\}$$

The inverse transform which converts $I(s)$ to $i(t)$ is:

$$i(t) = \frac{V_m}{Z} \left\{ \sin(\omega t + \phi_1) + \frac{1}{\beta\sqrt{LC}} e^{-\frac{R}{2L}t} \sin(\beta t + \phi_2) \right\}$$

where:

$$Z = \sqrt{R^2 + \left(\omega L - \frac{1}{\omega C}\right)^2}$$

$$\beta = \sqrt{\frac{1}{LC} - \frac{R^2}{4L^2}}$$

$$\phi_1 = \tan^{-1}\left\{ \frac{\frac{1}{\omega C} - \omega L}{R} \right\}$$

$$\phi_2 = \tan^{-1}\left\{ -\frac{2\beta L}{R} \frac{\omega^2 LC - 1}{\omega^2 LC + 1} \right\}$$

Further defining:

$R=Z$ at resonance = 50 ohms
C at resonance, when center of groove 5 aligns with faces $7 = C_R = 10$ mmfd.
C at off-resonance, when leading or lagging edges of faces 7 align with edge of groove $5 = C_N = 30$ mmfd.
Resonant frequency = 200 kilocycles
$\omega = 2\pi f = 1.256 \times 10^6$ radians/second
$L = 1/\omega^2 C_R = 63.4 \times 10^{-3}$ henries
$\omega L = 80 \times 10^3$ ohms
$1/\omega C_R 80 \times 10^3$ ohms
$1/\omega C_N = 27 \times 10^3$ ohms The voltage response is equal to the flux rate of change with time times the number of turns of the inductance, or the value of inductance times the rate of change of current therein with respect to time is expressed by the law of induction which states:

$$e = \text{induced electromotive force} = -N\frac{d\phi}{dt} = -L\frac{di}{dt}$$

Flux will change with time when interrupted as magnetic flux interruption means described above, which is the same as interrupting current flow by opening a switch in an electrical circuit in which the current is flowing. This will induce a transient expressable by differentiating the general current equation with respect to time. Multiplying the differentiated current by $-L$, we obtain:

$$e = -L\frac{di}{dt} = -\frac{V_m L}{Z}\left\{ [\omega \cos(\omega t + \phi_1)] + \frac{e^{-\frac{R}{2L}t}}{\sqrt{LC}}\left[\cos(\beta t + \phi_2) - \frac{R}{2L\beta}\sin(\beta t + \phi_2)\right] \right\}$$

The voltage induced at resonance taking into consideration that $\phi_1 = \phi_2 = 0$, from the table of calculations below, $$e_R = -\frac{V_m L}{Z}\left\{ [\omega \cos \omega t] + \frac{e^{-\frac{R}{2L}t}}{\sqrt{LC}}\left[\cos \beta t - \frac{R}{2L\beta}\sin \beta t\right] \right\}$$

Which approximates to:

$$e_R \cong -\frac{V_m L}{R}\left\{ \omega \cos \omega t + \frac{e^{-\frac{R}{2L}t}}{\sqrt{LC}} \cos \beta t \right\}$$

since $R/2L\beta$ is very small compared to 1.

Since at off-resonance, $$\phi_1 = \phi_2 = -\frac{\pi}{2}$$

radians as taken from the table of calculations below, the voltage response when the groove 5 just enters or just passes the faces 7 is a transient response since C just changes from $C_N$ to $C_R$ or from $C_R$ to $C_N$, or to some intermediate value of C; the change in capacitance acts as a switch and hence contributes to a transient response which we will refer to as the off-resonance response. Where $C=C_N$ and Z is the impedance including the resistance and the reactances, the off-resonance voltage response is:

$$e_{OR} = -\frac{V_m L}{Z}\left\{ \left[\omega \cos\left(\omega t - \frac{\pi}{2}\right)\right] \right.$$

$$\left. + \frac{e^{-\frac{R}{2L}t}}{\sqrt{LC}}\left[\cos\left(\beta t - \frac{\pi}{2}\right) - \frac{R}{2L\beta}\sin\left(\beta t - \frac{\pi}{2}\right)\right] \right\}$$

$$= -\frac{V_m L}{Z}\left\{ [\omega \sin \omega t] + \frac{e^{-\frac{R}{2L}t}}{\sqrt{LC}}\left[\sin \beta t + \frac{R}{2L\beta}\cos \beta t\right] \right\}$$

and due to $R/2L\beta$ being very small compared to 1, $$e_{OR} \cong -\frac{V_m L}{Z}\left\{ \omega \sin \omega t + \frac{e^{-\frac{R}{2L}t}}{\sqrt{LC}} \sin \beta t \right\}$$

Recognizing that during the condition when groove 5 is not opposite the faces 7, nor just entering or just passing these faces, there will be no change in magnetic flux and no change in current, therefore:

$$di/dt = 0$$

and the induced electromotive force in L, will be $$e_S = 0$$

TABLE OF CALCULATIONS

| Parameter or condition | At resonance | At off-resonance |
|---|---|---|
| Z | 50 ohms | $53 \times 10^3$ ohms |
| $\beta$ | $1.25 \times 10^6$ | $0.725 \times 10^6$ |
| $\phi_1$ | 0 | $\tan^{-1}(-53,000) = -\frac{\pi}{2}$ |
| $\phi_2$ | 0 | $\tan^{-1}(-317) = -\frac{\pi}{2}$ |
| $\sqrt{LC}$ | $8 \times 10^{-4}$ | $13.84 \times 10^{-4}$ |
| At $t=0$, $\frac{e^{-\frac{R}{2L}t}}{\sqrt{LC}}$ | 1,250 | 720 |
| Maximum value | $\omega \cos \omega t = 1.256 \times 10^6$ | $\omega \sin \omega t = 1.256 \times 10^6$ |
| Value for $-\frac{V_m L}{Z}$ | $-1,28 \times 10^{-3}$ | $-1.2 \times 10^{-6}$ |
| $e_{peak}$ | $-1,610.00$ | $-1.61$ |

If we consider the application of the computed parameters of FIG. 1, the ratios of, $$e_R/e_{OR} \cong 1000; \text{ and}$$

$$e_R/e_S \cong \text{infinity}$$

The turns ratio of secondary to primary windings in FIG. 1, necessary to produce 30,000 volts peak at the secondary for the computed parameters at resonance will be 18.5.

Considering the application to an automotive ignition system of an eight cylinder engine, wherein the angle occupied by each stator element is 30 degrees out of a 360 degree distribution means with 15 degree spacing between any two stator elements, the dwell period corresponding to 30 degrees is:

| When distributor rotates at (rev. per minute): | Rotation period per stator element (seconds) |
|---|---|
| 250 | $5 \times 10^{-3}$ |
| 5000 | $10^{-3}$ |

Since 5000 r.p.m. will be about as fast as any distributor will rotate it can be seen that quite a number of cycles at 200 kilocycles per second of the frequency source will be present in the induced electromotive force in inductance L during the period of $10^{-3}$ seconds; even more cycles will be produced at 250 r.p.m.

Considering the application to a high voltage pulse means (FIG. 3), only one inductor having a core of magnetizable material is required together with a means such as 2a to interrupt the flux many times at the resonance peak is required and will be hereinafter discussed.

IGNITION SYSTEM

Referring to FIG. 1, the magnetic ignition system is mounted on internal combustion engine block 32 and mechanically coupled to said engine by means of shaft 3 which extends into engine and mechanically couples to the cam shaft of the internal combustion engine. In a normal engine, shaft 3 drives the distributor arm. Base 1 is of electrically insulating material which rests on engine block 32 and on which is mechanically attached two cores 6 made of magnetizable material and oppositely disposed from each other. Extending through the center of base 1 is shaft 3 which also extends through cylindrical collar 4 which cooperates with the outer surface of shaft 3 to provide electrical connection to shaft 3 when same is driven. Shaft 3 also extends through rotatable capacitor cylinder member 2 made of magnetizable material and having a longitudinal groove 5 therein. Cores 6 each have two faces 7 at the ends thereof and form two small capacitors electrically connected in parallel with each other when taken in combination with the outer surface of member 2 which is the other plate of the two parallel capacitors. Each of cores 6 has wound thereon primary coil 9 (referred to in the theory of operation as L) upon each of which is wound secondary coil 10. Oscillator 11 putting out a voltage, $v = V_m \sin \omega t$, is mounted on base 1.

Motor block 32, shaft 3, member 2, and sleeve 4 are all at the same electrical potential being connected electrically to ground 18. The negative terminal of battery 15 and the seats of spark plugs 19 and the power and signal return of oscillator 11 are at negative battery potential or ground 18. Also at ground potential is one side of each secondary winding 10, each electrically connected by means of wire to sleeve 4. Sleeve 4 is also electrically connected by means of wire to ground terminal 18 of oscillator 11. Each high side of primary winding 9 is electrically connected by means of wire to screw terminal 20 in core 6, the other side of each primary being electrically connected to the high signal potential output terminal of oscillator 11. The high side of each of secondary windings 10 are electrically connected by means of wire to a center electrode of spark plug 19. The low signal potential output terminal of oscillator 11 is electrically connected by means of wire to stationary contact 13 of ignition switch 12. The movable contact 14 of ignition switch 12 is electrically connected by means of wire to the positive terminal of battery 15. The negative terminal of battery 15 is electrically connected by means of wire to ground or signal return 18. Base 1 has slot 16 therein through which extends set screw 17. Set screw 17 is used for securing base 1 so that the firing voltage is advanced or retarded as desired at the proper angle. In view of the fact that coils 9 are electrically connected to core 6, as explained in the theory of operation, they form the capacitor plates of a portion of the capacitor as explained in the theory of operation in combination with member 2. When switch 12 is closed so that contacts 13 and 14 cooperate and power from battery 15 is supplied to oscillator 11, oscillator 11 delivers an alternating voltage to primaries 9 creating an alternating current therein. Upon rotation of shaft 3 when driven by the internal combustion engine and when the normal member 2 surface is opposite faces 7 only a steady state primary current flows, but when groove 5 just passes faces 7, a resonant transient current flows in primary 9 which is interrupted by groove 5. The capacity when the groove is not aligned with faces 7 is too large to cause resonance but when groove 5 aligns with faces 7 the capacity is just right to create a resonant current and a resonant magnetic interrupted flux in primary 9. Also an off-resonant current flows, of lower magnitude than the resonant current when groove 5 is about to enter in alignment with or has just passed alignment with faces 7. The theory indicates a ratio of induced resonant voltage to induced off-resonant voltage of about 1000, thereby indicating very sharp pulses induced into the primary only during alignment of groove 5 with faces 7. Since the induced voltages will only be high on alignment of groove 5 and faces 7 during motion of member 2, due to the double effect of resonant tuning and flux interruption at that point, there is no concern of spill-over to adjacent coils of other cores since decay of these induced voltages will also be rapid. If the secondary winding 10 has 18.5 as many turns as the primary winding 9, then a peak voltage of 30,000 volts will be induced therein at resonance flux interruption for the parameters chosen, and will be more than sufficient to fire spark plugs 19. A computation of the power levels and energy levels in the primary due to induced voltages is extremely high compared to conventional ignition systems. It is therefore seen that high voltages will be alternately induced into each secondary as the groove 5 passes the particular core 6 and faces 7 thereof, thereby successively firing spark plugs 19.

PHOTOGRAPHIC FLASH

Referring to FIG. 3, the operation and structure of a photographic flash device is substantially the same as that of the ignition system of FIG. 1, except that only one core is used and the rotatable capacitor 2a driven by shaft 3 of motor 29 has a plural number of grooves 5 instead of one groove, enabling flash action to occur more frequently, and instead of a spark plug the secondary 10 is electrically connected to a gas filled tube 31 requiring a high voltage source for flash ignition. Oscillator 11 has its high side electrically connected to one side of inductance primary 9 the other side of primary 9 being electrically connected to terminal 20 on core 6. Power is provided oscillator 11 by an electrical connection between contact 24 of push button 21 and oscillator 11. Contact 24 is also electrically connected to the high side of motor 29. Battery 15 is electrically connected to contact 23 of push button 21. The return sides of oscillator 11 and motor 29 are electrically connected to ground or signal return 18 and the negative side of battery 15 and shaft 3 as well as member 2a are electrically connected to the ground or signal return 18. These electrical connections provide a resonant circuit when oscillator 11 powers primary 9 and capacitor members comprising faces 7 of core 6 and member 2a when groove 5 is rotated opposite faces 7 by motor 29 action when motor 29 and oscillator 11 are powered at the time when movable contact 22 of push button 21 is manually depressed, resonance is established and the flux is interrupted and the resonant current changed in coil 9 proportional to the rate of change of current times the value of inductance of coil 9 or proportional to the rate of change of magnetic flux and the number of turns of coil 9 product. The voltage induced is transformed to a higher voltage by transformer action between coils 9 and 10 inducing a high voltage across coil 10 to fire and ignite the gas in a flash manner in tube 31. Rotation of member 2a stops when push button 21 is manually released thereby stopping the flash action or ignition of gas in tube 31. A time delay solenoid shutter actuator may be electrically connected to contact 24 the return side thereof to ground 18 thereby being actuated momentarily after push button 21 is manually depressed, or movable contact 22 may be mechanically coupled directly to a mechanical shutter activator to activate the shutter upon ignition of flash tube 31. Neither time delay solenoid or mechanical coupling to movable contact 22 is shown in FIG. 3.

Other applications where high voltage pulses are required are obvious from the two specific applications delineated above.

It is also obvious that faces 7 form the magnetic poles of core 6.

LASER IGNITION

Referring to FIGS. 4 and 5, a laser ignition system is possible. The magnetic cores 6, the shaft 3, the capacitor cylinder 2 with groove 5 therein, the primaries 9, the secondaries 10, the battery 15 and the oscillator 11 are identical in structure and in function as in FIG. 1 and similarly connected. The secondary high sides however have their connecting wires 48 each electrically connected to xenon gas filled tubular coils 42 each of which are wound on a ruby or similar laser element 40 whose end is mirrored or has a mirror 41, the other end of ruby 40 cooperating with a Pyrex or other high temperature glass rod or polystyrene rod 43 the opposite end thereof being injected into the aperture wherein normally a spark plug is seated in engine block 32 and held therein by means of member 47. The return sides of xenon lamp 40 are connected to electrical or ground return 18. A high voltage is induced into coil 10 similarly as described in connection with FIG. 1, above, this high voltage exciting the xenon gas particles and flash illuminating tube 40 whenever groove 5 passes faces 7 of core 6. Rod 40 acts as a cavity resonator, the light traveling along the cylindrical axis and bouncing off mirror 41 to be communicated in a direction opposite to mirror 41 through the center or axis of member 43. Member 43 being of polystyrene or other fibre optic material (of high temperature conducting capability) will bend the coherent or concentrated laser beam emanating from the axis of member 40 and propagating through member 43 axis into the engine cylinder of the internal combustion engine to ignite the gasses therein; the gas in the engine cylinder being in a compressed state since at the time of the laser pulse the piston had just compressed the gas, now ready for ignition. In this system power to laser pulse is provided by oscillator 11 which receives its power from battery 15 when ignition switch 44 which has its stationary contact 46 connected electrically to oscillator power input and movable contact 45 electrically connected to the positive side of battery 15, and switch 44 is closed to that contacts 45 and 46 cooperate with each other.

Elimination of member 43 is possible by having separate laser igniters as shown in FIG. 5. In this case members 40 and 42 would be installed in a jacket 49. One end of rod 40 having mirror 41 and the other end extending through the center and held by member 52. Member 52 is threaded into the base of jacket 49. The outside of jacket 49 is threaded into metal seat 53 for insertion into motor block 32. At the upper end of jacket 49 is located member 50 for connection of the high side of xenon lamp 42 thereto and for connection of wire 48 constituting the high voltage output of coil 10 to cap 51. The lower end of xenon lamp 42 is connected to member 54 which is electrically connected to seat 53 and constitutes the return side of ground 18 which is also the motor block 32. In this way the circuit of FIG. 4 is the same except that ruby rod 40, xenon lamp 42, do not reside in the distribution mechanism but reside in a separate igniter as shown in FIG. 5.

Any of the laser ignition systems above described may be used as a photographic flash apparatus by utilizing the xenon lamp as a light flash high intensity source.

I claim:
1. A device for producing a voltage, comprising in combination:
   inductance means; and
   capacitance means which includes means common to and comprising a portion of both the inductance and capacitance means, said capacitance means having rotatable means for varying the capacitance of the capacitance means during rotation thereof thereby providing periodic tuning of said inductance and capacitance means and a changed flux therein for producing said voltage.
2. The device as stated in claim 1:
   said rotatable means being a member having at least one aperture at its periphery.
3. The device as stated in claim 2:
   said common means being at least one magnetic core, each said magnetic core having a first coil wound thereon.
4. The device as stated in claim 3, including:
   at least a second coil wound on each said magnetic core for providing an increase in the magnitude of said voltage.
5. The device as stated in claim 4, including:
   flash means connected to said second coil and responsive to the increased voltage.
6. The device as stated in claim 2, including:
   laser means adapted to the inductance means and responsive to rotational action of said rotatable means for producing a flux in said laser means.
7. The device as stated in claim 4, including:
   laser means adapted to said second coil and responsive to rotational action of said rotatable means for providing a flux in said laser means.
8. The device as stated in claim 6:
   the laser means being at least one laser igniter, said laser igniter having a laser element and laser pumping means, the voltage across said inductance means providing laser pumping action upon said laser means.
9. The device as stated in claim 7:
   the laser means being at least one laser igniter, said laser igniter having a laser element and laser pumping means, the voltage produced across said second coil providing laser pumping action upon said laser means.

References Cited

UNITED STATES PATENTS

| | | | |
|---|---|---|---|
| 3,233,128 | 2/1966 | Tyzack | 310—70 |
| 3,253,168 | 5/1966 | Robbins | 310—70 |
| 3,328,614 | 6/1967 | Falge et al. | 310—70 |
| 3,370,190 | 2/1968 | Neapolitakis | 310—70 |
| 3,447,004 | 5/1969 | Falge | 310—70 |
| 3,461,851 | 8/1969 | Stephens | 310—70 X |

MILTON O. HIRSHFIELD, Primary Examiner

M. BUDD, Assistant Examiner

U.S. Cl. X.R.

123—148; 317—79